United States Patent [19]
Kalapathy

[11] Patent Number: 5,799,169
[45] Date of Patent: Aug. 25, 1998

[54] EMULATED REGISTERS

[75] Inventor: Paul E. Kalapathy, Los Gatos, Calif.

[73] Assignee: Chromatic Research, Inc., Mountain View, Calif.

[21] Appl. No.: 537,496

[22] Filed: Oct. 2, 1995

[51] Int. Cl.[6] .................................................. G06F 9/455
[52] U.S. Cl. ............................................ 395/500; 395/825
[58] Field of Search ................................ 395/500, 825, 395/826, 874, 883, 828, 742, 567, 568, 856, 843; 364/488, 489, DIG. 1

[56] References Cited

U.S. PATENT DOCUMENTS

| | | | |
|---|---|---|---|
| 3,938,101 | 2/1976 | Lewis et al. | 395/500 |
| 3,955,180 | 5/1976 | Hirtle | 395/500 |
| 4,313,160 | 1/1982 | Kaufman et al. | 364/DIG. 1 |
| 4,365,294 | 12/1982 | Stokken | 364/DIG. 1 |
| 4,812,975 | 3/1989 | Adachi et al. | 364/DIG. 1 |
| 4,885,681 | 12/1989 | Umeno et al. | 364/DIG. 1 |
| 4,887,202 | 12/1989 | Tanaka et al. | 364/DIG. 1 |
| 4,888,680 | 12/1989 | Sander et al. | 364/DIG. 1 |
| 5,291,614 | 3/1994 | Baker et al. | 395/800 |
| 5,301,302 | 4/1994 | Blackard et al. | 395/500 |
| 5,367,661 | 11/1994 | Hough et al. | 395/500 |
| 5,440,697 | 8/1995 | Boegel et al. | 395/500 |
| 5,488,713 | 1/1996 | Norton et al. | 395/500 |
| 5,557,774 | 9/1996 | Shinabukuro et al. | 395/500 |
| 5,566,326 | 10/1996 | Hirsch et al. | 395/500 |
| 5,574,927 | 11/1996 | Scantlin | 395/500 |

*Primary Examiner*—Kevin J. Teska
*Assistant Examiner*—Tyrone V. Walker
*Attorney, Agent, or Firm*—Skjerven, Morrill, MacPherson, Franklin & Friel; Edward C. Kwok

[57] ABSTRACT

A structure and a method allows I/O or memory addresses of hardware registers to be emulated in software by a central processing unit (CPU). In one embodiment, a first-in-first-out (FIFO) memory is provided to queue read and write operations of the emulated hardware registers. A programmable interrupt mask registers enables certain write operations to the emulated hardware registers to cause an interrupt at the CPU.

12 Claims, 5 Drawing Sheets

EMULATED REGISTERS

BACKGROUND OF THE INVENTION

1. Field of the Invention

The present invention relates generally to logic circuits. In particular, the present invention relates to hardware design for supporting software emulation of functions associated with certain input and output (I/O) addresses, where such functions are normally accomplished by dedicated hardware.

2. Discussion of the Related Art

In the address spaces of many microprocessors, such as the microprocessors of the x86 architecture[1], certain I/O addresses are associated with specific functions of certain classes of devices. In those systems, reading from or writing to these I/O addresses create side effects specific to these devices. For example, the digital signal processor (DSP) on the "Sound Blaster", a popular audio processing board available from Creative Labs., Inc, occupies I/O addresses 2x6h, 2xAh, 2xCh and 2xEh, where x represents a user-selectable base address. For example, when the address 2x6h is written into, the DSP is reset. The addresses 2xEh and 2xAh are used to pass data from the DSP to the microprocessor. By reading address 2xEh, which corresponds to the status register of a read-buffer in the Sound Blaster board under the DSP's control, the microprocess detects whether "in-bound" data (i.e. data coming into the system via the Sound Blaster, e.g. from a microphone) is available. If so, the in-bound data is read at I/O address 2xEh. Similarly, I/O address 2xCh is used to pass data from the microprocessor to the DSP. Writing into I/O address 2xCh passes a command to the DSP. The same address, however, is used as a status register by the DSP to communicate to the microprocessor whether it is ready to receive more data. A read operation by the microprocessor specifying I/O address 2xCh returns a value from which the microprocessor can determine if more data can be sent to the DSP.

The term "x86 architecture" refer to the architecture of a family of microprocessors offered by Intel Corporation, Santa Clara, Calif., and microprocessors offer by others compatible with this family.

In the prior art, in order for an alternative supplier to provide a plug-compatible product performing the functions associated with these well-known I/O addresses, logic circuits each dedicated to simulate the function performed at I/O address are provided in the plug-compatible product.

SUMMARY OF THE INVENTION

In accordance with the present invention, a system and a method are provided for emulating memory address-mapped input/output operations of multiple well-known devices, such as COM ports, VGA devices and audio signal processing system boards. Typically, the input/output operations are requested in read and write instructions issued by a host computer over an industry standard bus. Each of such instructions typically specifies a memory address associated with the selected device. The present invention allows a uniform representation and emulation of these devices in a flexible microprocessor or signal processing integrated circuit. By emulation in a microprocessor, or a signal processing integrated circuit, the present invention allows expandibility (e.g. additional devices emulated) and flexibility in system design. Further, such emulation allows a single general purpose or application specific processor to perform the tasks of a variety of dedicated circuits or hardware.

A system of present invention includes: (i) a logic circuit for receiving from the host computer the instructions representing the requested read or write operations, where the logic circuit provides, for each instruction received, an identifying code specifying which one of the multiple devices is to be emulated; (ii) a first-in-first-out (FIFO) memory for queuing the instructions and, for each instruction queued, the identifying code associated with that instruction; and (iii) a central processing unit reading from the FIFO the queued instructions and emulating, for each of the instructions, the operation of the device specified by the identification code.

In one embodiment of the present invention, an interrupt generation circuit is provided for detecting a selected instruction and generating, accordingly, an interrupt signal the central processing unit to request immediate service. The central processing unit responds to the interrupt signal by reading the queued instructions from the FIFO and emulating operations specified in the queued instructions in the sequence the instructions are queued in the FIFO. Typically, the interrupt signal is triggered by detection of a write instruction.

In one embodiment of the present invention, the FIFO memory includes a programmable threshold representing the number of instructions queued in the FIFO which triggers generation of an interrupt signal to the central processing unit when the threshold is reached. In one embodiment of the present invention, the FIFO memory is provided in a static random access memory accessed by the central processing unit.

The present invention is better understood upon consideration of the detailed description below and the accompanying drawings.

DETAILED DESCRIPTION OF THE PREFERRED EMBODIMENT

Figure 1:
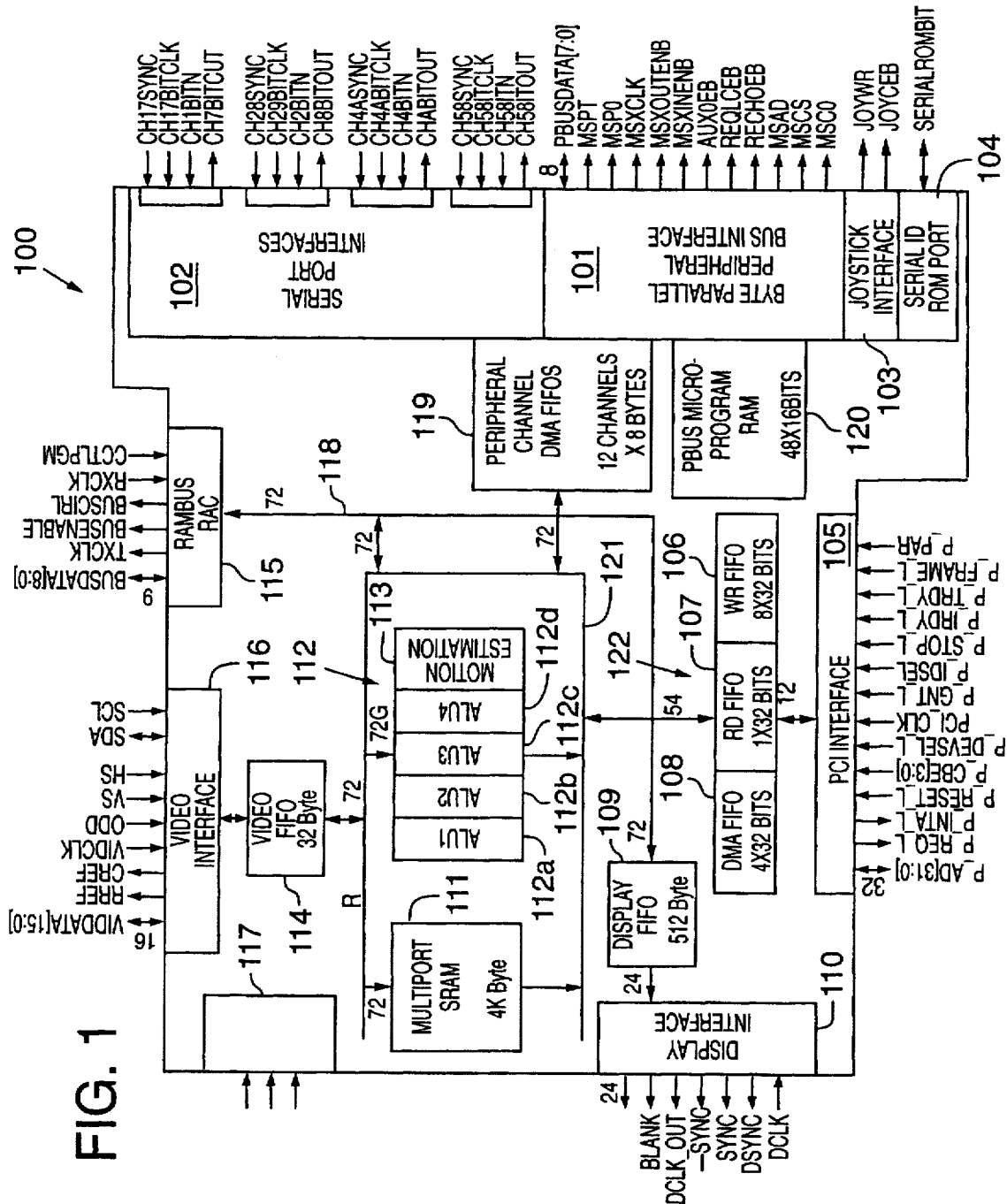
FIG. 1 is a block diagram of a signal processing integrated circuit 100 in which an embodiment of the present invention is implemented.

The present invention provides a uniform structure and a method for emulating systems in which system functions are performed by reading and writing dedicated I/O addresses. FIG. 1 is a block diagram of a signal processing integrated circuit 100 in which an embodiment of the present invention is implemented. Integrated circuit 100 performs the functions associated with the dedicated I/O addresses. One example of integrated circuit 100 is the VSP-1 processor described in the "VSP-1 Data Sheet", available from Chromatic Research, Inc., Mountain View, Calif. 94043. The "VSP-1 Data Sheet" is hereby incorporated by reference in its entirety to provide background information for such a processor. As shown in FIG. 1, integrated circuit 100 includes (i) a byte-parallel peripheral interface 101 capable of supporting 14 channels on an 8-bit peripheral bus, (ii) a serial port interface 102, which supports simultaneously four serial channels, (iii) a Rambus[2] random access controller (RAC) 115, for interfacing with a random access memory, (iv) a video interface 116, for transferring video data to and from an external digital video source, (v) a test logic circuit 117, for providing a bit-serial interface for test access, (vi) a display interface for a graphical display, and (vii) an interface 105 to an external PCI bus. A "game" or "joystick" interface 103 is provided for coupling integrated circuit 100 to a pointing device. Serial ID ROM port 104 allows an external device access to an identity code of integrated circuit 100 stored in a read-only memory word.

Rambus is a proprietary memory bus architecture of Rambus, Inc., Mountain View, California.

Internal to integrated circuit 100 are four arithmetic and logic units 112a–112d, each providing support for a selected group of arithmetic and logic instructions. Also provided is a dedicated motion estimation circuit 113 for performing motion estimation in video compression and decompression applications. Motion estimation circuit 113 and arithmetic and logic units 112a–112d are designed to operate in parallel, each taking input data from and writing results into static random access memory (SRAM) 111 over CPU bus 121. In the present embodiment, SRAM 111 is provided as a memory module with 512 72-bit (eight 9-bit bytes) words (i.e. 4K bytes). For convenience in this description, arithmetic and logic units 112a–112d and motion estimation circuit 113 are collectively referred to as central processing unit (CPU) 112. Integrated circuit 100 buffers its input and output data in a number of first-in-first-out buffers ("FIFOs"). FIFO 114 is a video FIFO for buffering video data between the CPU 112 and video interface 116. Likewise, peripheral channel DMA FIFO 119, display FIFO 109, PCI FIFO 122 are FIFOs provided between CPU bus 121 and byte-parallel peripheral bus interface 101, display interface 110 and PCI interface 105 respectively. PCI FIFO 122 includes three FIFOs: (i) direct memory access (DMA) FIFO 108, (ii) read (RD) FIFO 107 and (iii) write (WR) FIFO 106.

Figure 2:
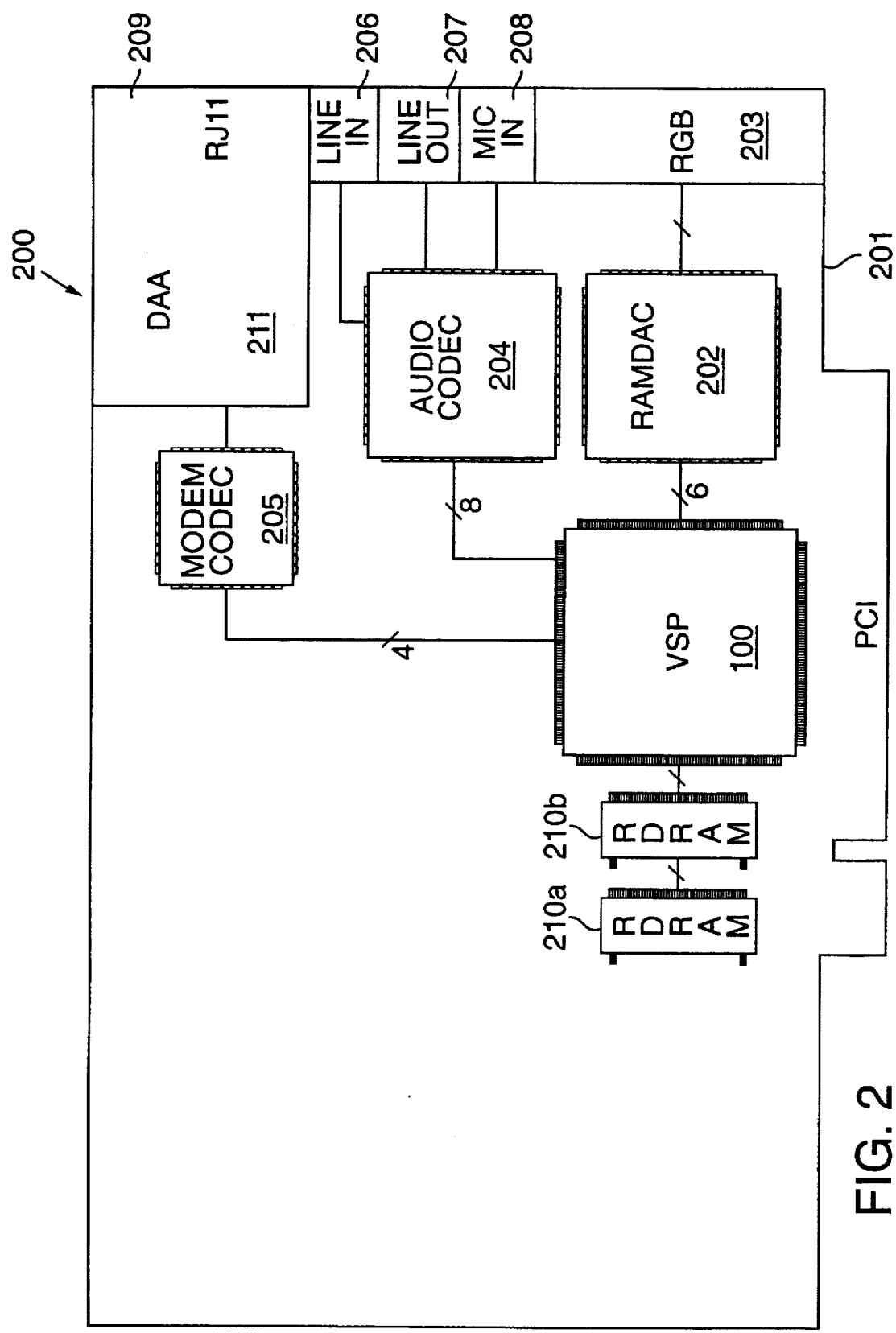
FIG. 2 is a block diagram of a signal processing system 200 on a printed circuit board 201 in which signal processing integrated circuit 100 can be implemented.

Integrated circuit 100 can be used in a "multimedia" system, such as multimedia signal processing system 200 shown in block diagram form in FIG. 2. As shown in FIG. 2, system 200 is provided on a printed circuit board 201. Printed circuit board ("system board") 201 is typically installed on a PCI bus. A host central processing unit ("host machine") typically communicates with system board 201 over the PCI bus. Integrated circuit 100 provides PCI interface 105 for coupling with the PCI bus, as discussed above. On system board 201, integrated circuit 100 is coupled to Rambus dynamic random access memory (RDRAM) modules 210a and 210b via RAC 115. A random access memory digital-to-analog converter (RAMDAC) 202 is coupled to integrated circuit 100's display interface 110. RAMDAC 202 is used to drive a video display through RGB interface 203. A modem coder/decoder (CODEC) 205 is coupled to one of the serial channels in serial interface 102 of integrated circuit 100 for serial input and output operations. Modem codec 205 is coupled to standardized connector interface 211 for connection to a telephone circuit. An audio CODEC 204 is coupled to a channel of peripheral bus interface 101, for handling audio input and output signals. These input and output signals are coupled to line-in interface 206, line-out interface 207 and microphone input interface 208.

Figure 3:
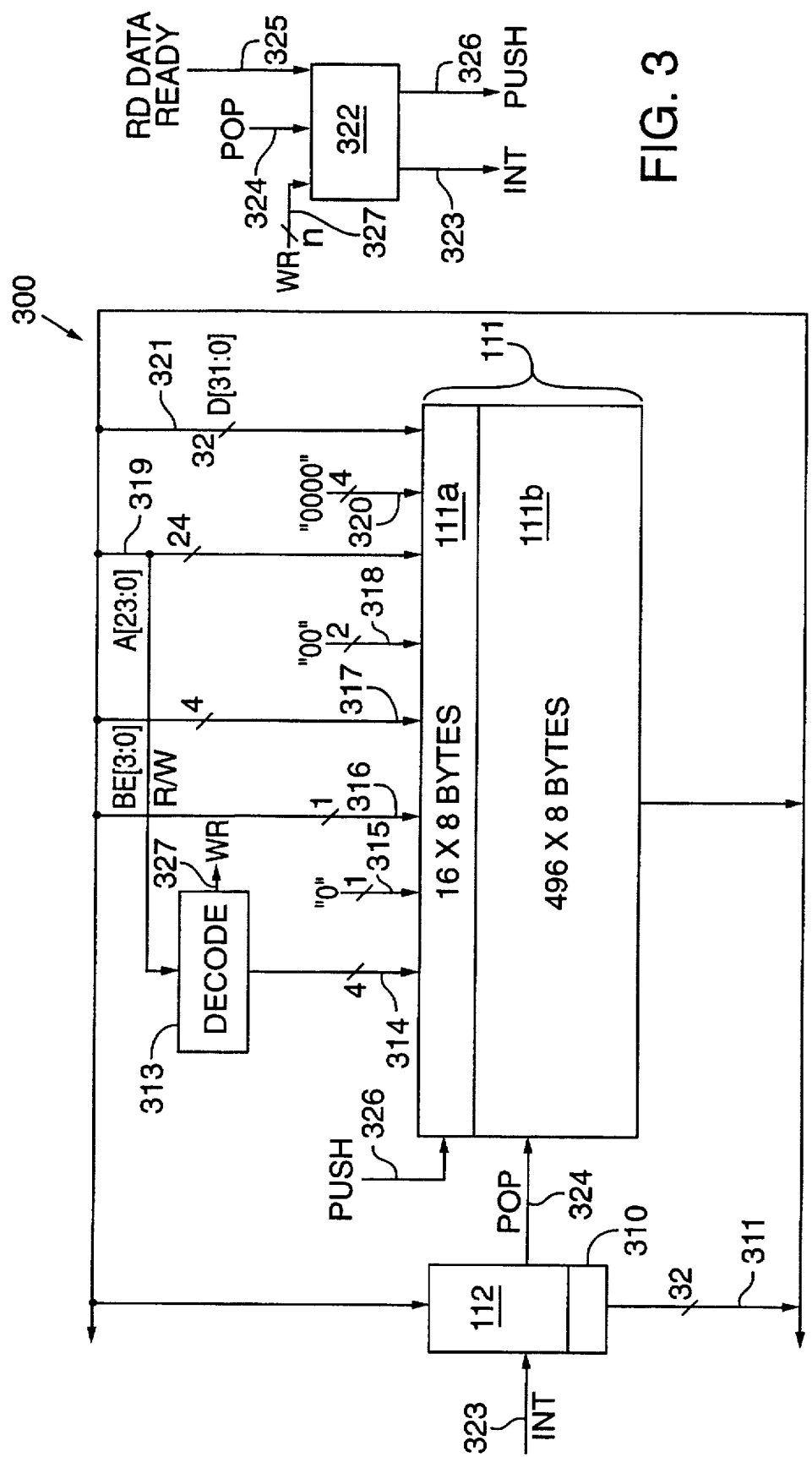
FIG. 3 is a schematic diagram of an embodiment 300 of the present invention implemented in integrated circuit 100 of FIG. 1.

The present invention provides emulation by integrated circuit 100 of the hardware registers which are previously assigned dedicated I/O addresses. FIG. 3 is a schematic diagram of an embodiment of the present invention implemented in integrated circuit 100. As shown in FIG. 3, sixteen words of SRAM 111 are allocated to be a FIFO memory 111a for queuing read and write requests to the dedicated I/O addresses. As mentioned above, each word ("sram[71:0]") in FIFO memory 111a is 72-bit wide. In the present embodiment, the following dedicated I/O addresses and memory addresses are emulated:

TABLE 1

| Virtual Device No. (VN) | Function | I/O Addresses |
|---|---|---|
| 0xC | COM | 2e8-2ef |
|  |  | 2f8-2ff |
|  |  | 3e8-3ef |
|  |  | 3f8-3ff |
| 0xD | Sound Blaster | 220-22f |
|  |  | 240-24f |
| 0xA | Sound Blaster FM | 388-38f |
| 0x9 | VGA | 3b0-3bf |
|  |  | 3c0-3cf |
|  |  | 3d0-3df |
|  |  | 46e8 |
| 0xB | MPU401 | 330-331 |
| 0xE | Joystick | 201 |
| 0x0 | VGA Memory | a0000-bfff[3] |
| 0x0 | VGA ROM | c0000-cfff[4] |

The "Virtual Device No." or (VN) is a code word indicating the specific class of devices associated
[3]The addresses in the VGA Memory are memory addresses.
[4]The addresses in the VGA ROM are memory addresses.

with the corresponding address or addresses. For example, the code word "0xD" represents all addresses in the range 2x0 to 2xf used to specify specific functions in the "Sound Blaster" audio processing board. A conventional FIFO control module 322 is provided to control the operation of FIFO 111a in the SRAM 111. When PCI interface 105 detects a read or write I/O address instruction, PCI interface 105 asserts a "RD Data Ready signal" 325, which indicates that PCI interface 105 is placing the read or write I/O address instruction onto CPU bus 121. In the present embodiment, the following fields are extracted from CPU bus 121 and provided as input to SRAM 111: (i) a 32-bit data word D[31:0] on input leads 321 (i.e. sram[31:0]); (ii) a 24-address word A[23:0] on input leads 319 (i.e. sram[59:36]); (iii) a 4-bit byte enable word BE[3:0] on leads 317 (i.e. sram[65:62]); (iv) a 1-bit signal R/W on lead 316 (i.e. sram[66]); and (v) a 4-bit virtual device number VN on leads 314 (i.e. sram[71:68]). The virtual device number VN is provided by logic circuit 313, which maps the I/O or memory address specified on leads 319 (i.e. A[23:0]) into the corresponding virtual device number specified above in Table 1. In addition, logic circuit 313 identifies a write operation based on the I/O address specified, and asserts a control signal on one of leads 327, indicating the specified write application. The signal R/W indicates whether the reference to the dedicated I/O or memory address is a read operation or a write operation. Each bit in the byte enable word BE[3:0] indicates whether the corresponding data byte in D[31:0] contains valid data.

After an appropriate delay, FIFO control module 322 asserts signal "PUSH" on lead 326 to strobe the value of sram[71:0] into FIFO 111a. Read instructions are queued in FIFO 111a and executed in sequence by an emulation program of CPU 112. The return value of the emulation, if any, is provided by CPU 112 on lead 121. The return value is then returned to the calling host computer via the PCI interface 105. For certain write instructions, to be described more fully below, FIFO control module 322 asserts signal INT on lead 323 to indicate to CPU 112 that immediate processing of the queued instructions in FIFO 111a is necessary.

In the present embodiment, FIFO control module 322 provides a user-programmable "water mark". The water mark is a preset threshold number of queued instructions in FIFO 111a which, when reached, triggers FIFO control module 322 to assert interrupt signal INT to CPU 112 to indicate that immediate processing of the queued instructions is advantageous in order to avoid unnecessary stalls.

Figure 4:
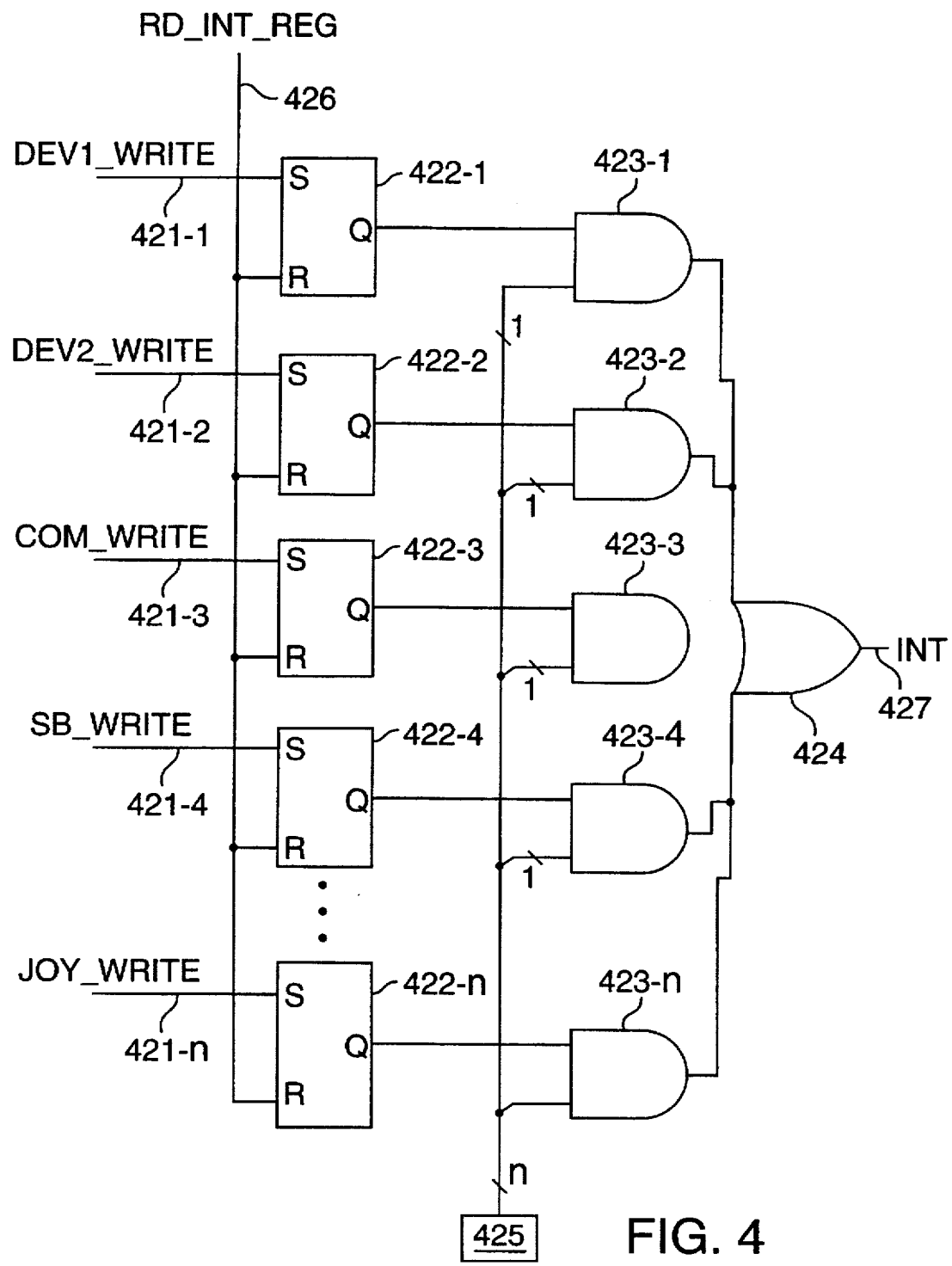
FIG. 4 is a schematic circuit for generating interrupt signal INT from FIFO control module 322 to CPU 112.

In many instances, the host computer stalls and waits for completion of a write instruction. Thus, when such an instruction is executed, FIFO control module 322 asserts on lead 323 interrupt signal INT to CPU 112, indicating immediate processing of the queued instructions is necessary to minimize the stall time of the host computer. A programmable circuit 400 for generating interrupt signal INT is provided in FIG. 4. The control signals 327 are shown in FIG. 4 as control signals 421-1 to 421-n. Each of control signals 421-1 to 421-n is asserted when logic circuit 313 successfully decodes a corresponding write operation specified by the I/O address on leads 319. For example, signal 421-4 is asserted when a write command/data access to the "Sound/Blaster" is decoded. Each of signals 421-1 to 421-n sets a corresponding one of set-reset flip-flops ("RS flip-flops") 422-1 to 422-n. The output value of each of RS flip-flops 422-1 to 422-n are gated with a corresponding bit of interrupt mask register 425 at a corresponding AND gate 423-1 to 423-n. The corresponding bit, when set, allows interrupt signal INT to be generated immediately to CPU 112 via OR gate 424. Interrupt signal INT is deasserted when CPU 112 reads an interrupt register (not shown), as indicated by control signal RD_INT_REG one lead 426.

Figure 5:
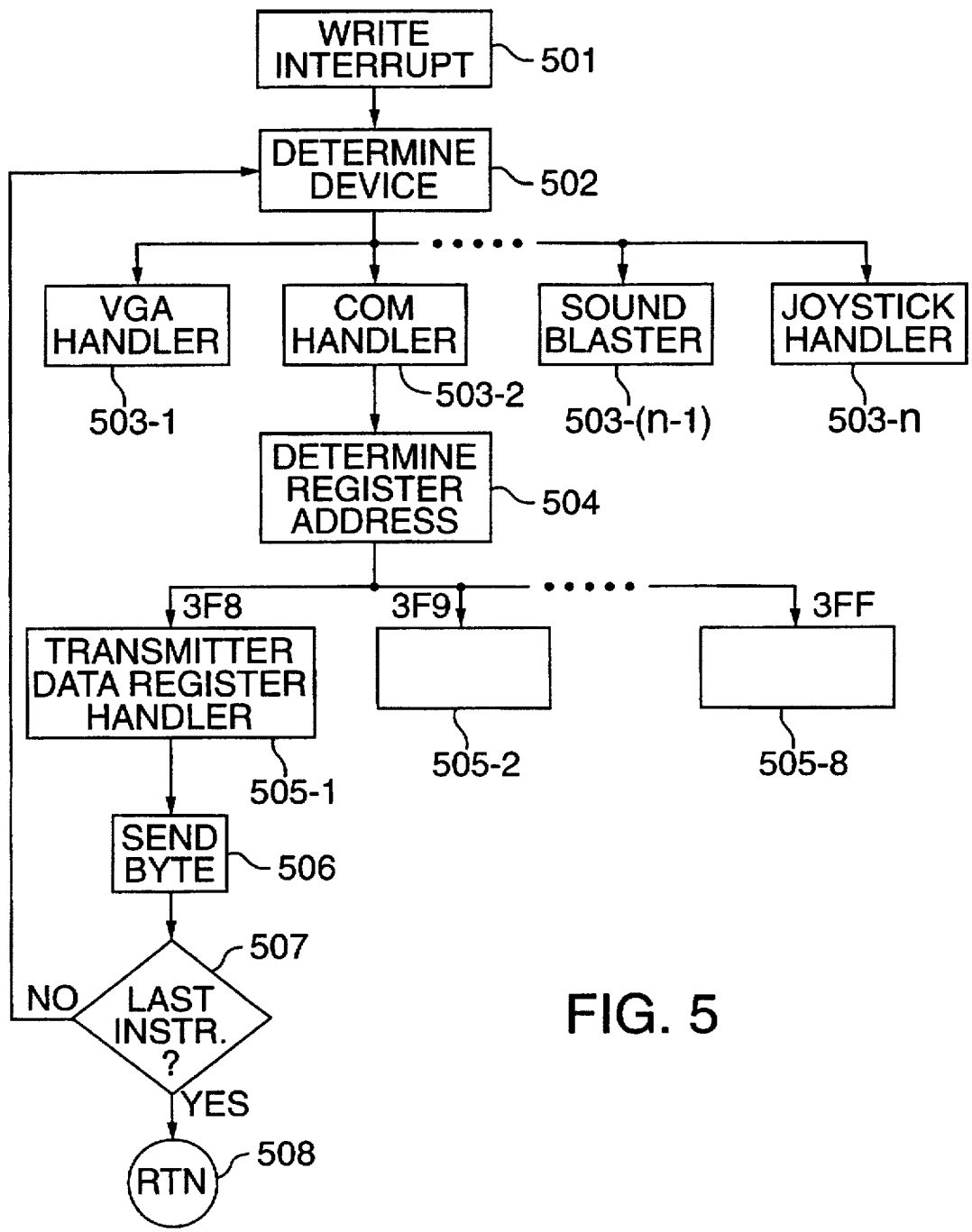
FIG. 5 is a flow diagram showing, as an example of an emulation process, the write operation of a COM port handler.

The input/output operation is emulated in CPU 112 in software. An example of such an emulation is illustrated in FIG. 5. As shown in FIG. 5, upon receiving an interrupt at step 501, CPU 112 retrieves from FIFO 111a the first queued read or write instruction. Using the virtual device number VN in the queued read or write instruction, CPU 112 transfers control to the appropriate input/output device handler, shown in FIG. 5 as device handlers 503-1, 503-2, . . . . 503-n. In this example, the device handler for emulating a COM port is shown as device handler 503-2 in FIG. 5. Device handler 503-2 then examines the I/O address specified (representing a hardware register to be emulated) in the read or write instruction to determine the operation requested. In this instance, at step 504, it is determined that the read or write instruction is a write instruction at address 3F8, indicating that a byte of data is to be written at serial device "COM1". Accordingly, at step 505-1, CPU 112 calls the transmitter handler routine corresponding to COM1. The called transmitter handler routine then initiates, at step 506, a sequence of instructions to cause serial port interface 102 to send the designated byte data at the appropriate serial channel in serial port interface 102. Upon completing execution of this write instruction, CPU 112 checks FIFO 111a to determine (step 507) if there is any more read or write instructions queued in FIFO 111a remaining to be serviced. If so, the next read or write instruction is read from FIFO 111a nd CPU 112 returns to step 502 to service the read or write service request. Otherwise, CPU 112 returns control to the interrupted routine at step 508.

The above detailed description is provided to illustrate the specific embodiments of the present invention and is not intended to be limiting. Numerous variations and modifications are possible within the scope of the present invention. The present invention is defined by the following appended claims.

I claim:

1. A system for emulating memory address-mapped or input/output operations of multiple devices, said operations being requested in instructions or bus transactions issued by a host computer, each of said instructions specifying an address associated with one of said multiple devices, said system comprising:

a logic circuit for receiving from said host computer said instructions, said logic circuit providing, for each instruction received, an identifying code specifying which one of said multiple devices is to be emulated;

a first-in-first-out (FIFO) memory for queuing said instructions and said identifying codes associated with said instructions;

a central processing unit reading from said FIFO said queued instructions and emulating, for each of said instructions, the operation of said device specified by said identification code for said specified address in said instruction; and wherein said logic circuit further comprising an interrupt generation circuit, said interrupt generation circuit detecting a selected instruction and generating an interrupt signal for said central processing unit to request immediate service.

2. A structure as in claim 1, wherein said central processing unit responding to said interrupt signal by reading said queued instructions from said FIFO and emulating operations specified in said queued instructions in the sequence said instructions are queued in said FIFO.

3. A structure as in claim 1, wherein said instructions comprise read and write instructions.

4. A structure as in claim 1, wherein said instructions comprise read and write instructions and wherein said interrupt signal is generated in response to a selected write instruction.

5. A structure as in claim 1, wherein said FIFO memory is provided in a static random access memory accessed by said central processing unit.

6. A system for emulating memory address-mapped or input/output operations of multiple devices, said operations being requested in instructions or bus transactions issued by a host computer, each of said instructions specifying an address associated with one of said multiple devices, said system comprising:

a logic circuit for receiving from said host computer said instructions, said logic circuit providing, for each instruction received, an identifying code specifying which one of said multiple devices is to be emulated;

a first-in-first-out (FIFO) memory for queuing said instructions and said identifying codes associated with said instructions;

a central processing unit reading from said FIFO said queued instructions and emulating, for each of said instructions, the operation of said device specified by said identification code for said specified address in said instruction; and wherein said FIFO memory includes a programmable threshold representing the number of instructions queued in said FIFO, said FIFO memory generating an interrupt signal when said threshold is reached.

7. A method for emulating memory address-mapped or input/output operations of multiple devices, said operations being requested in instructions or bus transactions issued by a host computer, each of said instructions specifying an address associated with one of said multiple devices, said method comprising the steps of:

receiving from said host computer said instructions;

providing, for each instruction received, an identifying code specifying which one of said multiple devices is to be emulated;

queuing in a first-in-first-out (FIFO) memory said instructions and said identifying codes associated with said instructions;

receiving from said FIFO said queued instructions;

emulating in a central processing unit, for each of said instructions, the operation of said device specified by said identification code for said specified address in said instruction;

detecting a selected instruction; and generating an interrupt signal for said central processing unit to request immediate service.

8. A method as in claim 7, wherein said central processing unit responding to said interrupt signal by reading said queued instructions from said FIFO and emulating operations specified in said queued instructions in the sequence said instructions are queued in said FIFO.

9. A method as in claim 7, wherein said instructions comprise read and write instructions.

10. A method as in claim 7, wherein said instructions comprise read and write instructions and wherein said interrupt signal is generated in response to a selected write instruction.

11. A method as in claim 7, wherein said FIFO memory is provided in a static random access memory accessed by said central processing unit.

12. A method for emulating memory address-mapped or input/output operations of multiple devices, said operations being requested in instructions or bus transactions issued by a host computer, each of said instructions specifying an address associated with one of said multiple devices, said method comprising the steps of:

receiving from said host computer said instructions;

providing, for each instruction received, an identifying code specifying which one of said multiple devices is to be emulated;

queuing in a first-in-first-out (FIFO) memory said instructions and said identifying codes associated with said instructions;

receiving from said FIFO said queued instructions;

emulating in a central processing unit for each of said instructions, the operation of said device specified by said identification code for said specified address in said instruction;

wherein said FIFO memory includes a programmable threshold representing the number of instructions queued in said FIFO, said FIFO memory generating an interrupt signal when said threshold is reached.

* * * * *